United States Patent [19]

Geidel et al.

[11] Patent Number: 5,054,285
[45] Date of Patent: Oct. 8, 1991

[54] THRUST REVERSER FOR TURBOFAN ENGINE

[75] Inventors: Helmjut-Arnd Geidel, Karlsfeld; Heinrich Enderle, Gröbenzell; Alois Rohra, Munich, all of Fed. Rep. of Germany

[73] Assignee: MTU Motoren- und Turbinen-Union Munchen GmbH, Fed. Rep. of Germany

[21] Appl. No.: 451,141

[22] Filed: Dec. 15, 1989

[30] Foreign Application Priority Data

Dec. 29, 1988 [DE] Fed. Rep. of Germany ....... 3844188

[51] Int. Cl.⁵ ................................................ F02K 3/02
[52] U.S. Cl. ..................................... 60/226.2; 60/228; 244/110 B; 239/265.39
[58] Field of Search ................. 244/23 D, 110 B, 12.5; 239/265.33, 265.35, 265.37, 265.39, 265.41, 265.25; 60/226.2, 228, 232, 230

[56] References Cited

U.S. PATENT DOCUMENTS

| | | | |
|---|---|---|---|
| 3,262,270 | 7/1966 | Beavers | 60/226.2 |
| 3,503,211 | 3/1970 | Medawar et al. | 60/226.2 |
| 3,665,709 | 5/1972 | Medawar et al. | 60/226.2 |
| 3,764,096 | 10/1973 | Wright | 244/110 B |
| 3,981,451 | 9/1976 | Prior et al. | 244/110 B |
| 4,030,291 | 6/1977 | Sargisson | 60/226.2 |
| 4,073,440 | 2/1978 | Hapke | 244/110 B |
| 4,145,877 | 3/1979 | Montgomery | 60/226.2 |
| 4,716,724 | 1/1988 | Newton | 60/226.2 |
| 4,731,991 | 3/1988 | Newton | 60/226.2 |

FOREIGN PATENT DOCUMENTS 1930829 3/1970 Fed. Rep. of Germany .
2018967 12/1970 Fed. Rep. of Germany .

Primary Examiner—Louis J. Casaregola
Assistant Examiner—John A. Savio, III
Attorney, Agent, or Firm—Evenson, Wands, Edwards, Lenahan & McKeown

[57] ABSTRACT

A gas turbine jet engine is disclosed with a fan delivering into a bypass duct to generate mainly propulsion thrust, and with a thrust reversing device having flaps which for reverse thrust operation pivot into the fan air stream and cooperate with an axially extended extreme section of the outer wall of the bypass duct to uncover delection ports arranged at breakthroughs in the outer wall. The extreme section of the outer wall and the thrust reverser flaps are linked one with the other for relative movement between them such that in a first phase of actuation relative to a fixed extreme nozzle section, the extreme section provides an additional fan nozzle area which communicates with the inlet flow areas formed by the flaps relative to the bypass duct.

28 Claims, 4 Drawing Sheets

THRUST REVERSER FOR TURBOFAN ENGINE

BACKGROUND AND SUMMARY OF THE INVENTION

This invention relates to a gas turbine jet engine of the type with a fan delivering into a bypass duct to generate mainly propulsion thrust, and with a thrust reversing device having flaps which for reverse thrust operation pivot into the fan air stream and cooperate with an axially extended movable extreme section of outer wall of the bypass duct to uncover deflection ports at breakthroughs in the outer wall. The invention particularly embraces aircraft engines in the modern propfan category with a shrouded blower or fan, where a fan air stream of extremely high bypass ratio of about 8:1 to 20:1 and over, generating the main propulsion thrust, is delivered into a bypass duct of varying length, depending on the type of engine involved, which envelopes the basic engine.

With a view to variable flight conditions, more particularly cruise flight operation, take-off phase, climb phase and deceleration processes (reverse thrust mode), the need to optimally adapt the engine from control and aerodynamic aspects to suit the associated variable thrust and performance requirements often involves considerable high-cost or uneconomical engineering penalties.

To be able to operate the engine over the entire operating regime with a comfortable margin relative to the surge limit (i.e. without compressor surge), the practice has been in prior art to prevent surge phenomena in configurations employing fixed and constant nozzle areas for the fan delivering into the secondary cycle or bypass duct by effecting relatively minor variations in blade pitch, sometimes in combination with extremely high torsional deflection of the fan blades, as in the full reverse thrust mode when air is being ingested from the rear. With priorart propfan engines having counterrotating fan blades on different rotors, this requires high-precision, elaborate individual blade actuating bearing provisions on the respective rotors, plus the associated variable-control blade actuating means.

Another difficult-to-surmount engineering problem involved is that of the mechanical loads the fan blades must undergo when operating in the reverse thrust mode.

In order to alleviate the engineering and control effort for variable fan blades with a view to variable engine load conditions, it has specifically been proposed to make the fan blades nonvariable and eliminate the risk of compressor surge by configuring the respective end of the outer fan wall or bypass duct partially as flaps which in thickness correspond to the outer wall and which serve to enlarge the fan nozzle area by flaring the flaps to suit the requirement for augmented mass flow and thrust (e.g. take-off or climb phase vs. cruise flight); and it has also been proposed to deploy the same flaps past the cruise flight nozzle position and into the fan propulsion jet for thrust reversing action while locally uncovering and forming thrust reversing ports at the aft end. In the interest of but a single respective flap pivot, said proposed arrangement would only in the cruise position achieve a reasonably streamlined outer contour of the shroud end in its segmented flap arrangement, and the requirement for maintaining a widened nozzle area when reverse thrust operation commences (deploying past the cruise nozzle position from the widened nozzle position) to provide the augmented mass flow to meet the higher thrust requirement is not satisfied. Also, the proposed arrangement involves relatively thick-walled, heavy-weight flaps and, hence, greater actuating forces to move them.

Disclosed in German Published Unexamined Patent Application (DE-OS) 20 18 967 is a thrust reversing arrangement for the fan air stream of a gas turbine jet engine, where jet deflection cascades axially protecting from an upstream portion of the outer bypass duct wall are uncovered on both sides by axially displacing a shroud end enveloping the cascades in the cruise position, and where thrust reverser flaps hinged to the centerbody are simultaneously deployed into the fan air stream; so that the thrust reverser flaps, when in the cruise position, form a partial section of the bypass duct inner wall on the upstream side of the cascades. Using said deflecting cascades, then, the respective thrust reverser flaps are merely shut-off means and aids to deflect the fan air stream towards the cascades. In this arrangement the movable extreme portion containing the outer annular nozzle shroud is a heavy-weight component necessitating relatively great actuating forces.

Nor does this prior art provide tangible approaches whatsoever to increasing the thrust nozzle area in critical load cases (takeoff phase, climb phase, reverse thrust operation) or to reducing the engineering and control effort especially with a view to modern propfan engine concepts of extremely high bypass ratios. This also applies in conjunction with a thrust reversing arrangement disclosed in German Published Unexamined Patent Application (DE-OS) 1 930 829 for the fan air stream of a ducted fan engine, where breakthroughs formed and locally staged between fixed, thick-walled wall portions of an outer fan stream shroud are covered flush or uncovered by pivotally arranged thrust reversing flaps designed to suit the breakthrough contours on both the inside and the outside such that these flaps can extend into the uncovered breakthroughs and form the major thrust deflection aids.

In a broad aspect the present invention provides a gas turbine jet engine of the generic description offered above, where engine load conditions departing from the cruise phase (e.g. take-off phase, climb phase, reverse thrust operation) can favorably be handled aerodynamically as regards the outside air and fan air streams, at comparatively moderate control and actuating efforts.

According to preferred embodiments of the invention, an arrangement is provided wherein the extreme movable section of the outer wall and the thrust reverser flaps are linked one with the other for relative movement between them such that in a first phase of actuation relative to a fixed extreme nozzle section of the bypass duct, the movable extreme section provides an additional fan nozzle area which communicates with inlet flow areas uncovered by the flaps relative to the bypass duct.

The present invention accordingly provides a technically comparatively simple arrangement for diverting a fan air stream portion from the secondary cycle through inlet flow areas uncovered upstream by the thrust reverser flaps (dipping movement into the bypass duct) and ducting it to the additional nozzle or nozzle area; so that the subsequent diverting process continues through the breakthroughs, between the axially movable outer extreme section and the thrust reverser flaps; and where especially in the first actuating or engine load control phase, a streamlined uninterrupted outer contour of the duct wall (small outer wall contour tail angle) is ensured over the distance from the upstream wall of the breakthroughs to the fixed nozzle section; and except for the deliberate opening of the inlet flow areas in the bypass duct, the fan air stream is—throughout the first actuating phase routed in practically the absence of aerodynamic turbulence or disturbance inside and downstream of the inner wall of the fixed nozzle section, to the primary annular nozzle area of the fan bypass duct provided by the said fixed nozzle section.

By means of the multipoint actuating kinematics of especially preferred embodiments to be discussed more fully below, plus the associated design and arrangement of the tracks, the thrust reverser flaps, being substantially longer axially than the breakthroughs, can be pivoted in a further parabolic lift/thrust movement (i.e. in the second actuating phase) locally through the breakthroughs so that in the reverse thrust position they project relatively far from the breakthroughs and simultaneously form the deflecting aids to guide the deflection stream while obviating the need for deflection cascades or similar devices. Thus, the arrangement of the present invention accordingly provides the nozzle exit area generally needed for thrust reversing operation between the respective extreme sections of the wall at the breakthroughs, these sections arching diagonally upwards from the inside to the outside, and the upstream sections of the flaps deployed into the breakthroughs, these latter sections acting as spoilers in the ambient air stream. Even when fully extended axially in the full reverse thrust position the extreme section produces no appreciable additional aerodynamic disturbance in the outside air stream.

The arrangement of the present invention provides another advantage by enabling a noncritical (for the engine) load transition from the first to the second actuating phase (additional nozzle area/thrust reversal) to be achieved by making the additional nozzle area provided in the first phase available already at the time the thrust reversing phase commences, so eliminating the need for newly creating it by means, e.g., of extra actuating kinematics. In all positions of the axially movable extreme section and the correspondingly variable thrust reverser flaps, then, the engine fan is given the total propulsive nozzle area it needs to cope with the engine load at the moment.

Without first having to operate the thrust reverser at all, therefore, the combination of movable extreme wall section (additional nozzle area) and flap actuation (uncovering the additional inlet flow areas leading to the open additional nozzle) provides in the first actuating phase, the vital means to cope with critical load cases deviating from the cruise phase (e.g. take-off phase, climb phase) such that compressor surge is prevented.

In a further advantageous aspect of the present invention the actuating elements plus associated control means of the actuating kinematics to be described below produce no aerodynamic disturbance in the outside air and the inner fan or bypass stream; the actuating elements and the tracks to be described more fully below can advantageously be arranged in, e.g., spaces between lands extending along the breakthroughs. Flap actuating levers, which are the only elements continuously extending into the fan air stream, can—to alleviate their drag—advantageously be arranged in the aerodynamic wake areas of struts extending for constructional and strength reasons between the outer wall and the centerbody of the engine, where the centerbody can simultaneously form the inner wall of the bypass duct.

Other objects, advantages and novel features of the present invention will become apparent from the following detailed description of the invention when considered in conjunction with the accompanying drawings.

DETAILED DESCRIPTION OF THE DRAWINGS

Figure 1:
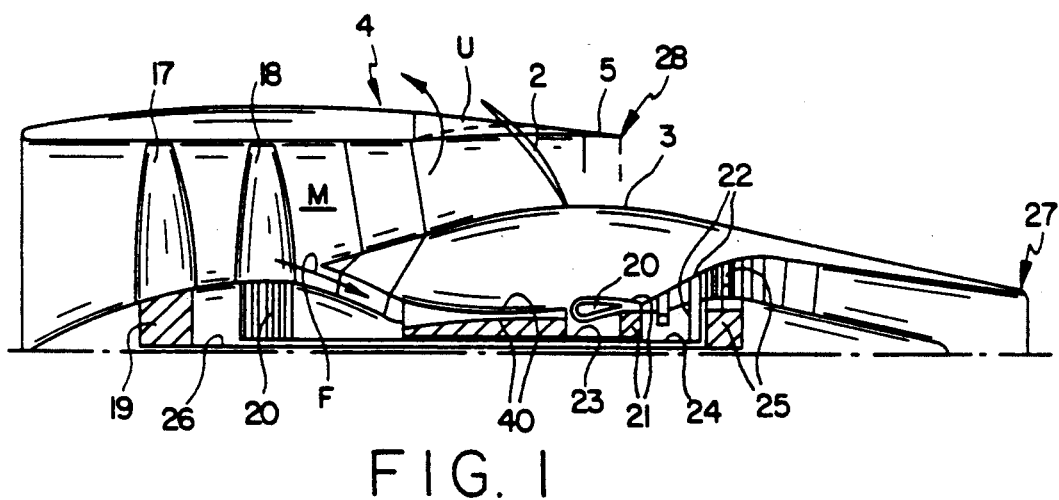
FIG. 1 is an elevation view and schematically illustrates one half of a blower or fan engine, constructed according to a preferred embodiment of the invention.

FIG. 1 schematically illustrates a gas turbine jet engine with a fan or front fan delivering into a bypass duct M. The fan is typified by two in-line rows of propeller-type fan blades 17, 18 arranged on counterrotating rotors 19, 20 or different rotor systems to be described more fully below. Relative to the basic engine or inner engine cycle, the fan here has an extremely high bypass ratio, where a bypass ratio of 16:1, e.g., signifies that the air mass flow of the fan is 16 times that of the mass flow passing through the inner engine flow duct or basic engine. The basic engine firstly includes the gas generator combining the high-pressure compressor 41, the combustion chamber 20 and the turbine 21 to drive the compressor 19. The compressor turbine 21 is aero-thermodynamically followed by an intermediate-pressure turbine 22 arranged on a tubular shaft 24 carried coaxially through the gas generator shaft 23 to drive the one fan rotor 20 and associated fan blades 18. The intermediate pressure turbine 22 is aero-thermodynamically followed by a low-pressure turbine 25 arranged on an inner shaft 26 carried coaxially through the tubular shaft 24 of the intermediate-pressure spool to drive the rotor 19 and fan blades 17 thereon. A fixed propulsive nozzle for the basic engine is indicated by the numeral 27. A nozzle of constant nozzle area for the cruise condition is arranged at the downstream end of the bypass duct M and is indicated by the numeral 28; it is formed by the annular area lying between a fixed nozzle section 5 and a centerbody 3. A fraction of the air stream delivered and compressed by the fan can be ducted in accordance with arrowhead F through an intake duct and onward to the high-compressor compressor 40 and hence to the gas generator in the basic engine for suitable processing and combustion (combustion chamber 20). The fan can optionally be provided with reducer gears omitted on the drawing, to suit the power requirement and the configuration selected. The latter arrangement may be appropriate for typically a single-stage front fan designed without an intermediate-pressure spool and the compressor and turbine members associated therewith; this type of fan is not shown on the drawing.

Figure 2:
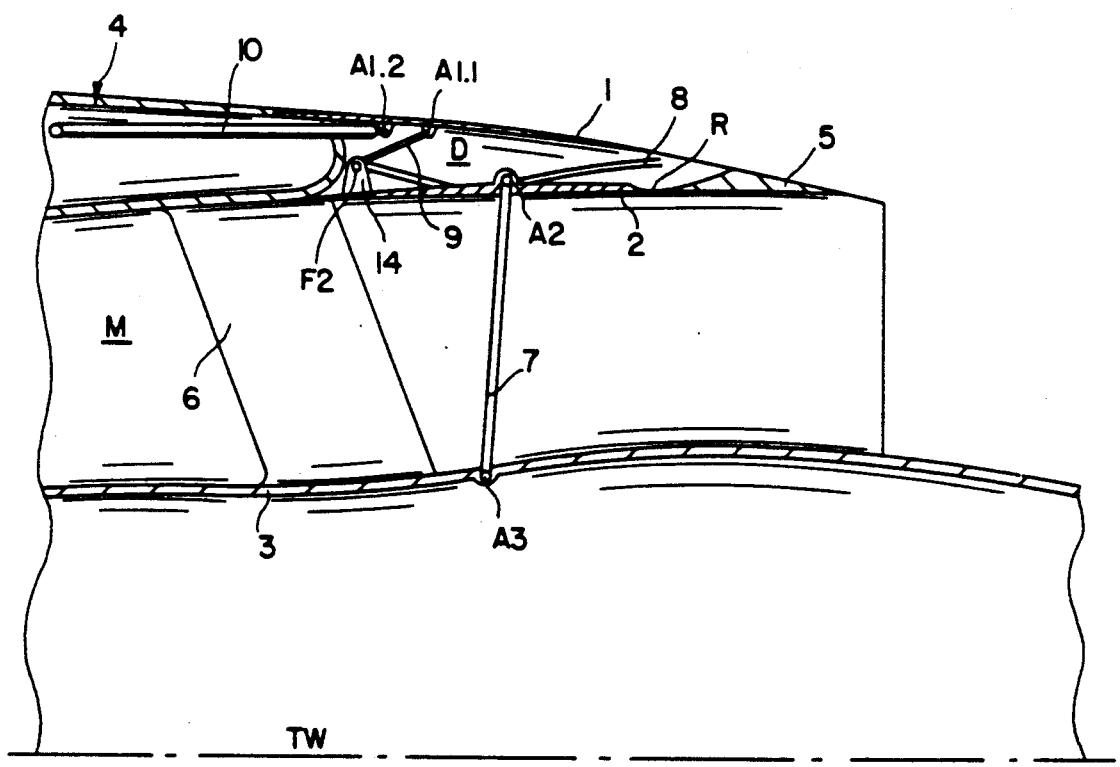
FIG. 2 is a sectional representation of the upper half of the engine illustrated in FIG. 1 and provides a detail view of the cruise position, where the outer extreme section and the thrust reverser flaps are arranged in the retracted position where for optimum aerodynamic effect they seal the breakthroughs in a flush configuration outside and inside.

With reference to FIG. 2 now (cruise position) the axially movable extreme section 1 represents a self-enclosed body of revolution in coaxial arrangement with the engine centerline. In this position the extreme section 1 has completely extended with its upstream portion into an axial recess S (see FIG. 3) on the outside of the engine or fan wall 4. At the downstream end the end face of the extreme wall section 1 abuts for axisymmetric sealing action on a mating face of the fixed nozzle section 5 such that streamlined, flush external closing of the respective breakthrough D is effected. In this arrangement the extreme wall section 1 is moderately cambered from a high outside point (front) to a low inside point to achieve a streamlined contour. The thrust reverser flap 2 in that region has proportionally great overall length and extends in essentially a horizontal direction when in the cruise position (FIG. 2). In this position, then, the thrust reverser flap 2 locally seals the respective breakthrough D flush at its upstream and downstream ends, i.e. without causing aerodynamic eddies or other disturbance in the fan air stream in the bypass duct M.

In accordance with the basic concept of the present invention the extreme section 1 of the outer wall 4 and the thrust reverser flaps 2 are mutually coupled and synchronized for relative motion with respect to each other such that in a first actuating phase the extreme section 1 provides an additional fan nozzle area above and beyond that provided by a fixed extreme nozzle section 5 of the bypass duct M, said additional area communicating with the inlet flow sections Z (FIG. 3) opened by the flaps 2 relative to the bypass duct M. In accordance with FIG. 3, then, the additional nozzle area is formed between an outer surface 5' of the fixed extreme nozzle section 5, said outer surface back tapering axisymmetrically in a downstream direction, and an approximately parallel end of the movable extreme section 1 of the outer wall 4.

Figure 3:
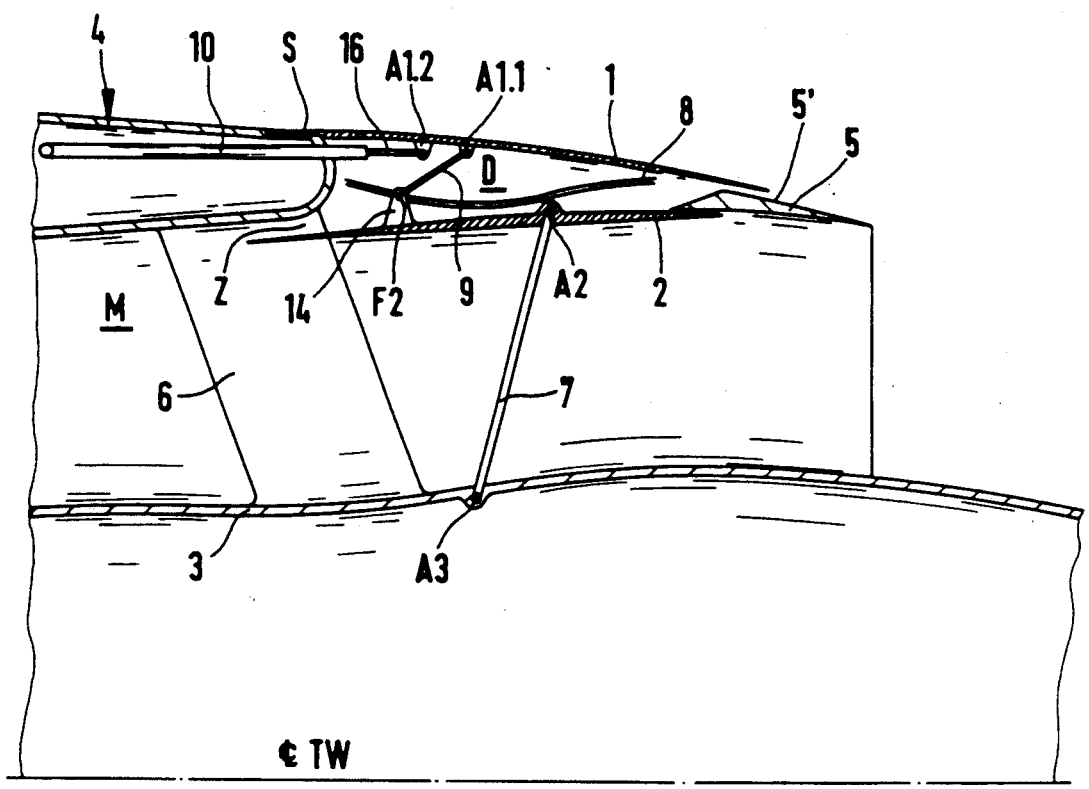
FIG. 3 is a sectional view of the engine half from FIG. 2 and details the completed second actuating phase, where the additional nozzle areas are illustrated in conjunction with the bypass duct by way of the partially extended extreme section, with the inlet flow areas being completely opened locally by the thrust reverser flaps.

In this position of FIG. 3, the movable extreme section 1 of the outer wall 4 is, in said first actuating phase, movably carried at its upstream end in a recessed extreme section S of the outer wall 4 for sealing action. In this phase, circumferentially equally spaced breakthroughs D formed in this region in the outer wall 4 between the fixed extreme nozzle section 5 and the upstream extreme members of the wall are sealed off. Upon completion of the first actuating phase (FIG. 3), therefore, the nozzle area provided by the axially shifted extreme section 1 of the outer wall 4 communicates—via flow ducts formed along the respective breakthroughs D—between the extreme section 1 and the flaps 2, with the inlet flow areas Z uncovered by the flaps.

In a further advantageous aspect of the present invention the actuating force needed to operate the movable extreme section 1 and the thrust reverser flaps 2 is transferred to the extreme section 1 at circumferentially equally spaced points, where the actuating kinematics of the present invention are arranged such that links 9 are hinged to the axially extendable extreme section 1 for rotation about first axes of rotation A1.1, and the thrust reverser flaps 2 are movably connected in their front portions to the remaining free ends of said links at points F2, and by way of these connecting points F2 the thrust reverser flaps 2 can be moved along stationary wave-shaped tracks 8, where the arrangement of the present invention and the associated kinematics are advantageously selected such that by means of said tracks 8 the inlet flow areas Z on the flap side can at the start of the first actuating phase already be opened while the additional nozzle area is still kept closed by the moved extreme section 1. Upon completion of the second actuating phase (FIG. 3) the inlet flow areas are completely open and in the aggregate form a cross-sectional flow area which invariably should be larger than the additional nozzle area formed between the outer inclined surface 5' of the fixed extreme nozzle section 5 and the respective mating face of the approximately codirectionally inclined downstream wall of the extreme section 1.

An important provision for already said first actuating phase is that the thrust reverser flaps 2 be pivotally arranged additionally at pivots A2 which are three-dimensionally axially/radially offset from this position of the connecting points F2. For the purpose the actuating levers 7 are pivotally connected by their inner ends to a centerbody 3 enveloping the basic engine and forming the inner wall of the bypass duct M for rotation about a stationary axis of rotation A3.

In the first actuating phase, then, the thrust reverser flaps 2 are made to go through a combined axial/radial movement about the respective pivots and axes A2 and A3, respectively, while the breakthroughs D are locally uncovered and the flaps are simultaneously dipped at their upstream ends into the bypass duct M to provide the inlet areas Z, with their downstream ends abutting against the underside of the fixed extreme nozzle section 5 for sealing effect. As previously mentioned, therefore, the completion of the first actuating phase is represented by FIG. 3, in which the flap actuating levers 7 have moved about pivot A3 into a little more rearwardly tilted position than that shown in FIG. 2.

Figure 4:
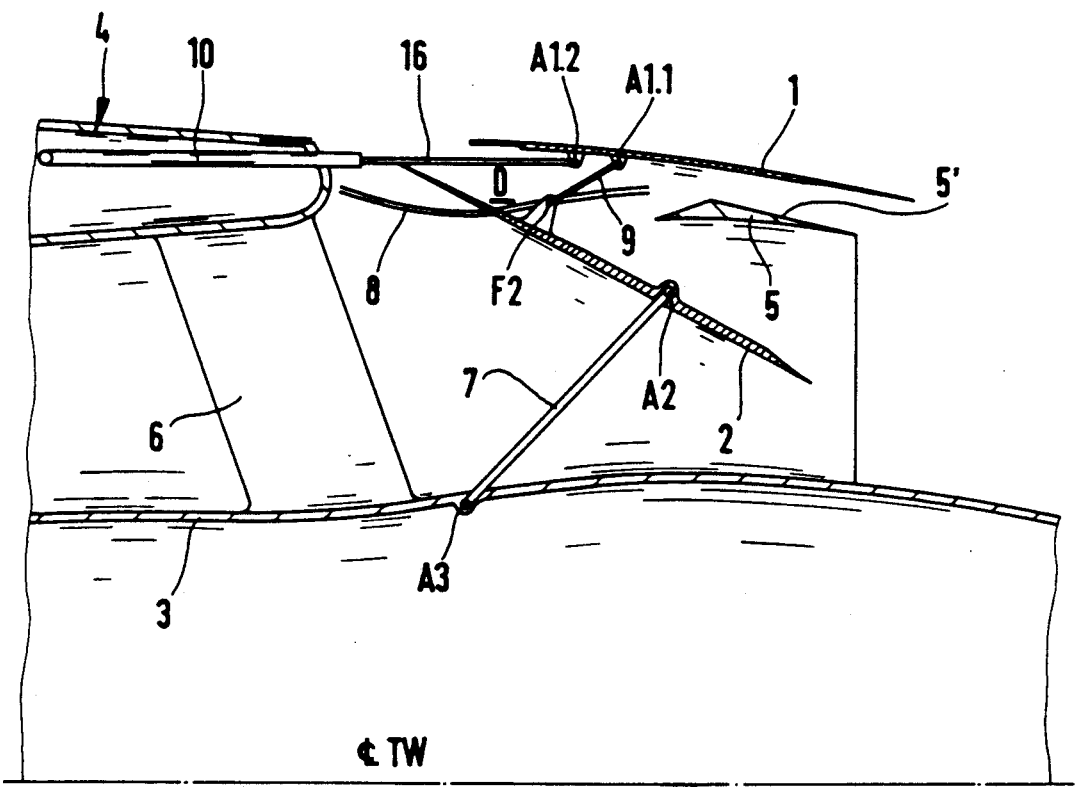
FIG. 4 is a sectional view of the engine half from FIGS. 2 and 3 now illustrating, in departure from FIG. 3 the second actuating phase when the extreme section is further extended axially and the thrust reverser flaps are partially extended into the breakthroughs locally for reverse thrust operation.

FIG. 4 depicts an intermediate-position phase in which the thrust reverser flaps have already moved out of their position of FIG. 3 to project with their upstream ends into the respective breakthroughs D, while with their remaining surface area they project into the fan air stream. In this position the respective upper and lower ends of the thrust reverser flaps thus define one each total fan air flow area corresponding to a nozzle area like the one shown in FIG. 3; i.e. in a combination from constant nozzle area via the fixed extreme nozzle section 5 of the bypass duct M and the selected additional nozzle area created between the downstream end of the extreme section 1 and the respective outer surface 5' of said fixed extreme nozzle section 5. The total exit area associated with the thrust reverser flap 2 position described in light of FIG. 4 is not affected by the enlarged annular flow area optically resulting from FIG. 4 between the chamfered outer surface 5' and the local end of the axially further extended extreme section 1.

Figure 5:
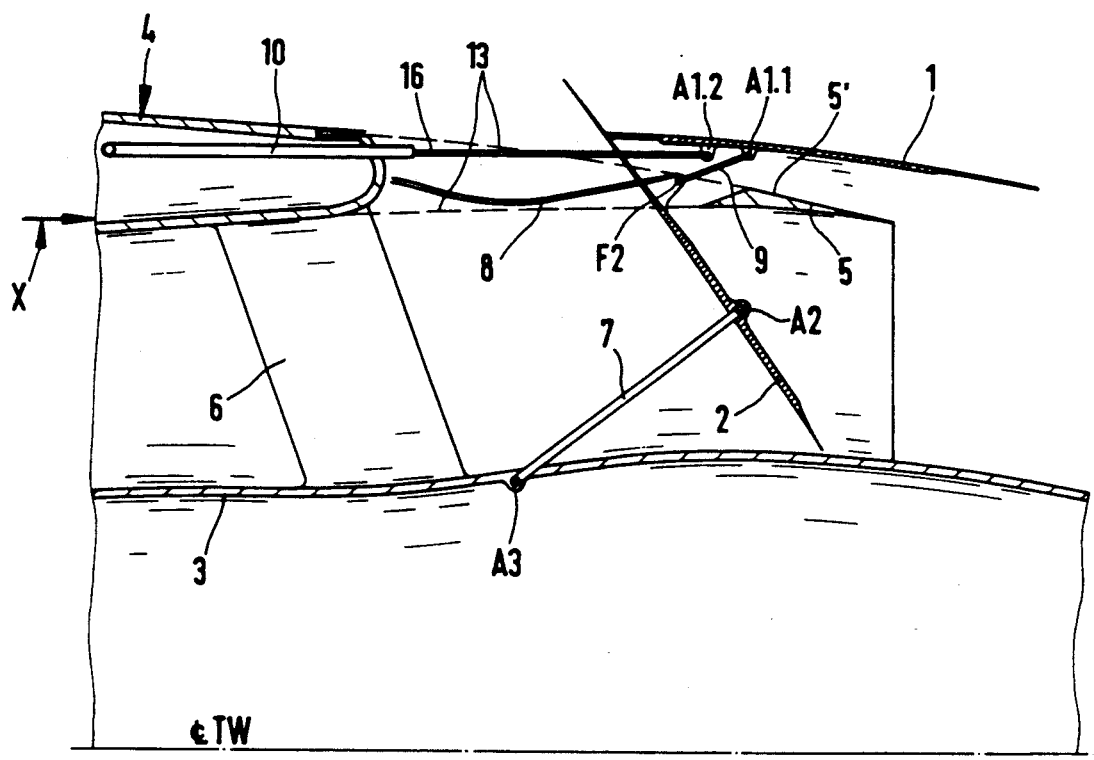
FIG. 5 is a sectional view of the engine half from FIGS. 2 to 4 now illustrating, in complementation of FIG. 4, the full reverse thrust position of the thrust reverser flaps with the extreme section being fully extended, where the flaps locally project from the breakthroughs to serve as flow deflection aids and on the inside have moved against the centerbody of the engine for maximum sealing of the bypass duct.

The tracks 8 are wave-shaped or radiused such that in the second actuating phase, which becomes apparent most clearly from a study of FIGS. 3, 4 and 5, in that order, in which the extreme section 1 continues to be extended axially while the additional nozzle area is maintained, the thrust reverser flaps 2 driven by the links 9 are pivoted in a parabolic lift/thrust movement about pivots and axes A2, A3 into the full reverse thrust position (FIG. 5). In the full reverse thrust position the thrust reverser flaps 2 are thus extended against the centerbody 3 and with their upstream sections, into the breakthroughs D and against the forward face of the extreme section 1.

In a further aspect of the present invention the previously cited and described breakthroughs D are formed between circumferentially equally spaced lands 13 (FIG. 6), arranged on or in which are the tracks 8 for each side of each thrust reverser flap 2.

Figure 6:
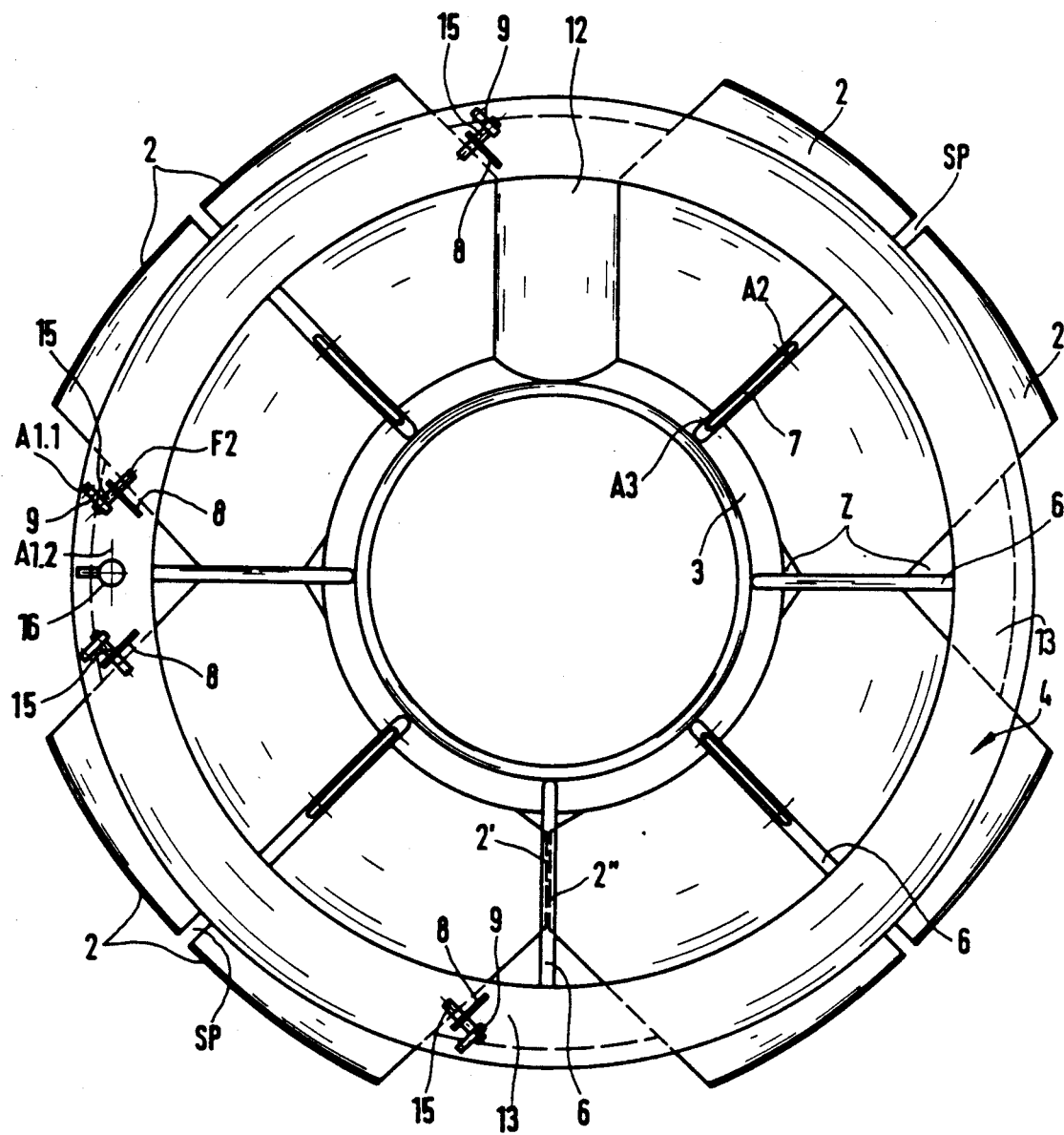
FIG. 6 is a general circumferential view in the direction of arrow X from FIG. 5.

In a further aspect of the present invention the thrust reverser flaps 2 are movably connected at the hinge points F2 and through lugs 14 (FIGS. 2 and 3), to the pins 15 which connect to the inner ends of the links 9 and engage in the respective tracks 8, which is depicted most clearly in FIG. 6. Although this solution is omitted on the drawing, said pins 15 may be arranged, with the aid of rollers or similar means, for movement along preferably roller or cam type tracks 8.

As it will also become apparent from FIGS. 2 to 6, axially arranged actuating elements 10 plus associated push-pull rods 16 in circumferentially equally spaced distribution may in a preferred aspect of the present invention each be carried centrally between two adjacent tracks 8 of a clam-shell land 13. These actuating elements 10 may take the shape of hydraulically or pneumatically operated actuators.

As it will also be seen from FIGS. 1 to 6, streamlined struts 6 may be provided between the wall 4 and the centerbody 3 to terminate at approximately the upstream end of the respective breakthroughs D, where the various flap actuating levers 7 are arranged at the level of the respective aerodynamic wake areas of said circumferentially equally spaced struts 6 and where, as it will best be seen from FIG. 6, the thrust reverser flaps 2 are each connected midspan at axes A2 to the outer ends of the flap actuating levers 7.

As it will also become apparent from FIG. 6 the thrust reverser flaps 2 have suitable lengthwise recesses SP permitting them to travel past said struts 6.

As it will be seen especially from FIG. 6 the thrust reverser flaps 2 are each inclined at adjacent extreme wall sections downstream such that in reverse thrust operation, congruent opposite extreme faces 2', 2'' are formed between the flaps.

As it is also showing in FIGS. 1 to 6 the outer wall 4 of the bypass duct M into which the fan delivers its air stream is a clam-shell construction.

As previously mentioned elsewhere herein in an analogous context the arrangement provides, in the cruise position (see FIG. 2), aerodynamically flush sealing of the breakthroughs D by means of the axially movable outer extreme section 1 on the one side and the thrust reverser flaps 2 on the other, the latter then being in essentially their horizontal position, where the extreme section 1 and all flaps 2 are clamped into position relative to the wall 4 and the extreme nozzle section 5. In this configuration the extreme nozzle section 5, together with its back tapered outer surface 5', presents to the outside air flow an aerodynamically flush extreme end of the bypass duct M and gives it a small nacelle tail angle.

Unlike the previously discussed and elaborated arrangement of FIGS. 2 to 6, an additional option exists of arranging the actuating elements used to provide the actuating force, directly within the lands 13 extending between the breakthroughs D. This latter arrangement has special merits when the intention is to make the extreme section 1, the thrust reverser flaps 2, the actuating elements plus kinematic actuating means, the lands 13 and the fixed nozzle section 5 an independently operable unit (module) that is easy to assemble on the engine.

As it will also become apparent from especially FIG. 6 the respective rear ends of the thrust reverser flaps 2 are radiused to suit the contour of the centerbody 3 in the full reverse thrust condition (FIG. 5).

FIG. 2 also illustrates that the thrust reverser flaps 2 exhibit on their downstream, or rear extreme surfaces, fillets R or recesses with which in the first actuating phase they can be extended into the fixed nozzle section 5 to produce a flush surface contour (FIG. 3).

As it will also be seen from FIG. 6, two circumferentially adjacent thrust reverser flaps 2 can be chamfered or recessed to suit an engine stinger 12 radially extending through the bypass duct M. With a view to the presence of such an engine stinger the axially movable extreme section 1 of the outer wall 4 exhibits a concentric, centrally extending lengthwise recess enabling it to axially travel past the respective engine stinger to reach the reverse thrust position (FIG. 5).

Worth noting additionally in light of FIGS. 2 to 6 is that the actuating force needed to operate the movable extreme section 1 and the thrust reverser flaps 2 can be transferred to the extreme section 1 via fixed or floating points A1.2 and the respective actuating elements 10.

In departure from the embodiments here shown the actuating force can optionally be transferred to the extreme section 1 also in the area or at the level of the first pivots A1.1.

In accordance with the present invention the extreme section 1 can be arranged for endwise movement via rollers or similar means on the lands 13, this arrangement not being shown on the drawing.

Precise actuation would also require the needed total actuating force to be transferred simultaneously and uniformly at the respective points, so that the respective actuating elements would have to be synchronised.

Said hydraulic or pneumatic actuators serving as actuating elements 10 can optionally be replaced also with actuating elements of other designs, such as ball-screw jacks.

Worth noting also is that the recess S (see FIG. 3) extending over the entire circumference to accommodate the local upstream end of the extreme section 1 can be replaced with a local groove in the circumferential wall.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas turbine jet engine, comprising:
   a bypass duct having an inner and outer wall and a fixed extreme nozzle section, said outer wall including breakthroughs for deflection ports;
   a fan delivering a fan air stream into said bypass duct to generate mainly propulsion thrust;
   a thrust reversing device including flaps pivotable into the fan air stream for reverse thrust operation;
   a movable extreme section of the outer wall being axially extendable, said flaps cooperating with said movable extreme section when axially extended to uncover the deflection ports located at the breakthroughs in said outer wall;
   wherein said movable extreme section and said flaps are mechanically linked to an another for relative movement between them; and
   an additional fan nozzle area provided by said movable extreme section in a first phase of actuation of said movable extreme section and said flaps relative to said fixed extreme nozzle section, said additional fan nozzle area communicating with inlet through flow areas uncovered by a front end of said flaps moved into said bypass duct.

2. Gas turbine jet engine of claim 1, wherein the additional fan nozzle area is formed between a back tapered outer surface of the fixed extreme nozzle section which is symmetrical in respect to an engine axis and a downstream end of the movable extreme section of the outer wall extending approximately parallel to said tapered outer surface.

3. Gas turbine jet engine of claim 1, wherein, during the first actuating phase the movable extreme section of the outer wall is movably guided for sealing action at an upstream end in a recessed section of the outer wall such that it seals off circumferentially equally spaced breakthroughs formed in the outer wall between the fixed extreme nozzle section and upstream parts of the outer wall.

4. Gas turbine jet engine of claim 1, wherein, during the first actuating phase the movable extreme section of the outer wall is movably guided for sealing action at an upstream end on a recessed section of the outer wall such that it seals off circumferentially equally spaced breakthroughs formed in the outer wall between the fixed extreme nozzle section and upstream parts of the outer wall.

5. Gas turbine jet engine of claim 1, wherein the additional nozzle area provided in the first actuating phase through the axially movable extreme section of the outer wall communicates via flow ducts formed along the respective breakthroughs between the movable extreme section and the flaps, with the inlet flow sections uncovered by the flaps.

6. Gas turbine jet engine of claim 1, wherein an actuating force needed to operate the movable extreme section and the thrust reverser flaps is transferred through circumferentially equally spaced points to the movable extreme section, wherein links are attached to the movable extreme section at first pivots, said links being attached to forward ends of the thrust reverser flaps at second pivots for movement by way of these second pivots along stationary wave-shaped tracks such that at the beginning of the first actuating phase the inlet flow areas at the flap end are already open while the additional nozzle area is still closed off by the movable extreme section as a result of the shape of the movable extreme section's trailing edge.

7. Gas turbine jet engine of claim 1, wherein flap actuating levers are provided which are pivotally connected at their outer ends to flap actuator pivots forming flap actuation axes at the thrust reverser flaps, said flap actuator pivots being axially and radially offset three-dimensionally in a manner relative to the position of second pivots located at forward ends of the thrust reverser flaps, and said flap actuating levers being pivotally connected by their inner ends for movement about a stationary axis of rotation to a centerbody which envelopes the basic engine and forms the inner wall of the bypass duct.

8. Gas turbine jet engine of claim 7, wherein the thrust reverser flaps are subjected to a combined axial and radial movement about the respective flap actuator pivots and stationary axes such that the inlet flow areas are formed in the first actuating phase by the flaps dipping into the bypass duct at their upstream end while locally uncovering the breakthroughs, in which phase the downstream ends of the flaps slide under the fixed nozzle section for sealing action.

9. Gas turbine jet engine of claim 6, wherein flap actuating levers are provided which are pivotally connected at their outer ends to flap actuator pivots forming flap actuation axes at the thrust reverser flaps, said flap actuator pivots being axially and radially offset three-dimensionally in a manner relative to the position of second pivots located at forward ends of the thrust reverser flaps, and said flap actuating levers being pivotally connected by their inner ends for movement about a stationary axis of rotation to a centerbody which envelopes the basic engine and forms the inner wall of the bypass duct.

10. Gas turbine jet engine of claim 9, wherein the thrust reverser flaps are subjected to a combined axial and radial movement about the respective flap actuator pivots and stationary axes such that the inlet flow areas are formed in the first actuating phase by the flaps dipping into the bypass duct at their upstream end while locally uncovering the breakthroughs, in which phase the downstream ends of the flaps slide under the fixed nozzle section for sealing action.

11. Gas turbine jet engine of claim 10, wherein the tracks have at least one of a wave-shaped and radiused form such that in a second actuating phase in which the movable extreme section continues to extend axially while the additional nozzle area is being maintained, the thrust reverser flaps are increasingly being pivoted into a full reverse thrust position in a parabolic lift and thrust movement about the flap actuation and stationary axes in which position they have moved against the centerbody and with their upstream sections, into the breakthroughs and against the front face of the extreme section.

12. Gas turbine jet engine of claim 6, wherein the breakthroughs are formed between circumferentially equally spaced lands on which are arranged the tracks for each side of each thrust reverser flap.

13. Gas turbine jet engine of claim 11, wherein the breakthroughs are formed between circumferentially equally spaced lands on which are arranged the tracks for each side of each thrust reverser flap.

14. Gas turbine jet engine of claim 6, wherein the thrust reverser flaps are movably connected at the second pivots by means of lugs and pins, said pins connecting to the inner ends of the links and engaging in the tracks.

15. Gas turbine jet engine of claim 14, wherein the pins travel along cam or roller type tracks by means of rollers.

16. Gas turbine jet engine of claim 12, wherein axially arranged actuating members plus associated push-pull rods are carried lengthwise in a circumferentially equal spacing and central arrangement between two adjacent tracks of a clam-shell shaped land.

17. Gas turbine engine of claim 7, wherein streamlined struts are provided between the outer wall and the centerbody which terminate approximately at the upstream side of the break-throughs, where the flap actuating levers are arranged in the aerodynamic wake zones of said struts and the thrust reverser flaps are connected midspan to said levers at said flap action pivots.

18. Gas turbine engine of claim 17, wherein the thrust reverser flaps exhibit suitable recesses enabling them to travel past the struts.

19. Gas turbine jet engine of claim 1, wherein the thrust reverser flaps are chamfered at adjacent boundary wall areas on the downstream side such that in reverse thrust operation, oppositely arranged congruent boundary surfaces are formed between the flaps.

20. Gas turbine jet engine of claim 2, wherein the outer wall is a clam-shell construction, where in the cruise flight condition a double wall is provided by aerodynamically flush sealing of the breakthroughs by the movable extreme section and the thrust reverser flaps, which at that time exhibit an essentially horizontal angle of incidence, where the fixed extreme nozzle section having said back tapered surface forms an aerodynamically flush external portion of the bypass duct with respect to outside air exhibiting a small nacelle tail angle.

21. Gas turbine jet engine of claim 1, wherein the rear ends of the thrust reverser flaps are curved to fit the contour of the centerbody.

22. Gas turbine jet engine of claim 1, wherein in the first actuating phase the thrust reverser flaps extend flush into the fixed extreme nozzle section, said flaps having recesses at rear upper ends to reduce the thickness.

23. Gas turbine jet engine of claim 1, wherein at least one of two circumferentially adjacent thrust reverser flaps and the movable extreme section are at least one of chamfered and recessed to accommodate an engine stinger extending radially through the bypass duct.

24. Gas turbine jet engine of claim 1, further comprising means for applying actuating forces arranged within lands extending between the break-throughs.

25. Gas turbine jet engine of claim 24, wherein the extreme movable section, the thrust reverser flaps, the actuating elements plus kinematic actuating means, the lands and the fixed nozzle section form a separately operable unit arranged for mounting on the engine.

26. Gas turbine jet engine of claim 1, wherein an actuating force is transferred to the extreme movable section through at least one of fixed and movable end points.

27. Gas turbine jet engine of claim 6, wherein the actuating force is transferred to the extreme movable section through at least one of fixed and movable end points.

28. Gas turbine jet engine of claim 27, wherein the actuating force is transferred to the movable extreme section at the first pivots.

* * * * *